US007680646B2

United States Patent
Lux-Pogodalla et al.

(10) Patent No.: US 7,680,646 B2
(45) Date of Patent: Mar. 16, 2010

(54) RETRIEVAL METHOD FOR TRANSLATION MEMORIES CONTAINING HIGHLY STRUCTURED DOCUMENTS

(75) Inventors: Veronika Lux-Pogodalla, Nancy (FR); Michel Simard, Meylan (FR)

(73) Assignee: Xerox Corporation, Norwalk, CT (US)

( * ) Notice: Subject to any disclaimer, the term of this patent is extended or adjusted under 35 U.S.C. 154(b) by 1484 days.

(21) Appl. No.: 11/018,891

(22) Filed: Dec. 21, 2004

(65) Prior Publication Data

US 2006/0136193 A1     Jun. 22, 2006

(51) Int. Cl.
*G06F 17/28* (2006.01)
(52) U.S. Cl. ............... 704/2; 704/4; 704/5; 704/7; 704/8; 715/264
(58) Field of Classification Search .......... 704/2, 704/8; 715/264, 265, 234; 707/2–6
See application file for complete search history.

(56) References Cited

U.S. PATENT DOCUMENTS

| | | | |
|---|---|---|---|
| 5,642,522 A | 6/1997 | Zaenen et al. | |
| 5,893,134 A * | 4/1999 | O'Donoghue et al. | 715/264 |
| 6,208,956 B1 * | 3/2001 | Motoyama | 704/2 |
| 6,345,244 B1 * | 2/2002 | Clark | 704/2 |
| 6,393,389 B1 | 5/2002 | Chanod et al. | |
| 6,405,162 B1 | 6/2002 | Segond et al. | |
| 6,470,306 B1 * | 10/2002 | Pringle et al. | 704/3 |
| 6,519,557 B1 * | 2/2003 | Emens et al. | 704/8 |
| 6,556,984 B1 * | 4/2003 | Zien | 707/2 |
| 6,598,015 B1 | 7/2003 | Peterson et al. | |
| 7,020,601 B1 * | 3/2006 | Hummel et al. | 704/2 |
| 7,054,803 B2 * | 5/2006 | Eisele | 704/2 |
| 7,143,115 B2 * | 11/2006 | Jones et al. | 707/200 |
| 7,333,927 B2 * | 2/2008 | Lee et al. | 704/4 |
| 7,353,165 B2 * | 4/2008 | Zhou et al. | 704/5 |
| 7,383,496 B2 * | 6/2008 | Fukuda | 715/230 |
| 2002/0138250 A1 * | 9/2002 | Okura et al. | 704/2 |
| 2003/0004702 A1 * | 1/2003 | Higinbotham | 704/2 |
| 2003/0074187 A1 | 4/2003 | Ait-Mokhtar et al. | |
| 2003/0154071 A1 * | 8/2003 | Shreve | 704/9 |

OTHER PUBLICATIONS

Madhavan et al., Generic Schema Matching with Cupid, Aug. 2001, MSR-TR-2001-58, p. 1-15.*
Aimelet, E., Lux, V., Jean, C., Segond, F., "WSD evaluation and the looking-glass", Conference TALN 1999, Cargese, Jul. 12-17, 1999.

(Continued)

*Primary Examiner*—David R Hudspeth
*Assistant Examiner*—Lamont M Spooner
(74) *Attorney, Agent, or Firm*—Fay Sharpe LLP

(57) ABSTRACT

In a translation apparatus, a translation memory (32) stores (i) source language target language translation unit pairs and (ii) structural information for at least some source language translation units indicating a structural position within a document from which the source language translation unit was derived. A comparator (30) compares a new source language translation unit with source language translation units stored in the translation memory. Each comparison includes (i) a textual comparison and (ii) a structural comparison between an identified structural position within a source language document (10) from which the new source language translation unit was derived and the structural information for the source language translation unit stored in the translation memory.

22 Claims, 3 Drawing Sheets

OTHER PUBLICATIONS

Ait-Mokhtar, S., Chanod, J-P., "Incremental Finite-State Parsing", Proceedings of Applied Natural Language Processing 1997, Washington, DC, Apr. 1997.

Ait-Mokhtar, S., Chanod, J-P., "Subject and Object Dependency Extraction Using Finite-State Transducers", Proceedings of the Workshop on Automatic Information Extraction and the Building of Lexical Semantic Resources, ACL, Madrid, Spain, 1997, p. 71-77.

Ait-Mokhtar, A., Chanod, J-P., Roux, C., "A Multi-Input Dependency Parser", Seventh International Workshop on Parsing Technologies, Oct. 17-19, 2001, Beijing.

Ait-Mokhtar, S., Chanod, J-P., Roux, C., "Robustness Beyond Shallowness: Incremental Dependency Parsing", Special Issue of *Natural Language Engineering*, vol. 8, Nos. 2/3, 2002 Cambridge University Press, UK, p. 121-144.

Ballim, A., Coray G, A. Linden, A., and Vanoirbeek, C. The Use or Automatic Alignment on Structured Multilingual Documents. In J. Andre et H. Brown (editor), Electronic Publishing, Artistic Imaging, and Digital Typography: proceedings/Seventh International Conference on Electronic Publishing, EP'98 Document Manipulation and Typography, Saint-Malo, France, Apr. 1998. Springer-Verlag, p. 464-475.

Bauer, D., Segond, F., Zaenen, A., "LOCOLEX, the Translation Rolls off Your Tongue", Proceedings of ACH-ALLC '95, Santa Barbara, CA, Jul. 11-15, 1995, p. 6-9.

Beesley, K.R., Karttunen, L., "Finite State Morphology", CSLI Studies in Computational Linguistics, CSLI Publications, Stanford, CA 2003.

Bille, P., "Tree Edit Distance, Alignment Distance and Inclusion", Technical Report TR-2003-23, IT University of Copenhagen, ISSN 1600-6100, Mar. 2003, ISBN 87-7949-032-8, p. 1-22.

Breidt, E., Segond, F., Valetto, G., "Formal Description of Multi-Word Lexemes with the Finite-State Formalism IDAREX", Proceedings of COLING, Copenhagen, Aug. 5-9, 1995, p. 1036-1040.

Breidt, E., Segond, F., Valetto, G., "Local grammars for the description of multi-word lexemes and their automatic recognition in texts", COMPLEX96, Budapest, Sep. 1996.

Bresnan, J., Kaplan, R.M., "Lexical-functional grammar: A formal system for grammatical representation", The MIT Press Series on Cognitive Theory and Mental Repr., Cambridge, MA, 1982, p. 173-281.

Brill, E., "A simple rule-based part of speech tagger", Third Annual Conference on Applied Natural Language Processing, ACL. 1992, p. 152-155.

Brun, C., "A client/server architecture for word sense disambiguation", Proceedings of the 18th International Conference on Computational Linguistics (COLING 2000), Saarbrucken, Allemagne, Jul. 31-Aug 4, 2000, p. 132-138.

Brun, C., Segond, F., "Semantic Encoding of Electronic Documents", *International Journal of Corpus Linguistic*, vol. 6, No. 1, 2001.

Casillas, A., Abaitua, J., Martinez, R.; "DTD-Driven Bilingual Document Generation", International Natural Language Generation Conference, Mitzpe Ramon, Israel, 2000, p. 32-38.

Casillas, A., Martinez, R., "Bitext segmentation and alignment for specialized document composition", *Traitement automatique de la langue* (TAL), vol. 42—No. Feb. 2001, p. 441-458.

Chomsky, N., "Syntactic Structures", Haag, Mouton, 1957.

Dini, L., DiTomaso, V., Segond, F., "Error Driven Word Sense Disambiguation", Proceedings of COLING/ACL98, Montreal, Canada, 1998, p. 320-324.

Dini, L., DiTomaso, V., Segond, F., "Ginger II: An example-driven word sense disambiguator", *Computers and the Humanities*, Special Issue on Senseval, vol. 34, No. 1-2, Apr. 2000, Kluwer Academic Publishers. The Netherlands p. 121-126.

Fellbaum, C., "Wordnet: An Electronic Lexical Database", The MIT Press, (Language, speech, and communication series), Cambridge, MA, 1998.

Gale, W.A., Church, K.W., "A Program for aligning sentences in bilingual corpora." 29th Annual Meeting of the Association for Computational Linguistics (ACL), Berkeley, CA, Jun. 1991, p. 177-184.

Gandrabur, S., Foster, G., "Confidence estimation for translation prediction", Seventh Conference on Natural Language Learning, Edmonton, Canada, Jun. 2003.

Ide, N., Veronis, J., "Word Sense Disambiguation: The state of the art", Computational Linguistics, vol. 24, No. 1, 1988.

Kupiec, J., "Robust part-of-speech tagging using a hidden Markov model", *Computer Speech and Language*, vol. 6, 1992, p. 225-242.

Navarro, G., "A guided tour to approximate string matching", ACM Computing Surveys, vol. 33 No. 1:31-88, 2001.

Navarro, G., Yates, R., Sutinen, E., Tarhio, J., "Indexing Methods for approximate string matching", IEEE Data Engineering Bulletin, vol. 24 No. 4: 19-27, 2001.

Pereira, F. C. N., Warren, D.H.D., "Definite clause grammars for language analysis—a survey of the formalism and a comparison with augmented transition networks", *Artificial Intelligence*, vol. 13, 1980, p. 231-278.

Poibeau, T., "Deconstructing Harry—une evaluation des systemes de reperage d-entites nommees", Revue de Societe d'electronique, Thales, 2001.

Romary, L., Bonhomme, P., "Parallel alignment of structured documents", Text Speech and Language Technology, Parallel Text Processing, 2000 Kluwer Academic Publishers, The Netherlands, p. 201-217.

Vergne, J., Pages, P., "Synergy of syntax and morphology in automatic parsing of French language with a minimum of data, Feasibility study of the method", Proceedings of COLING '86, Bonn, Aug. 25-29, 1986, p. 269-271.

U.S. Appl. No. 11/018,758, filed Dec. 21, 2004, Caroline Brun, et al.
U.S. Appl. No. 11/018,892, filed Dec. 21, 2004, Caroline Brun.

* cited by examiner

| FRENCH SOURCE | ENGLISH TRANSLATION |
|---|---|
| <newspaper title=LeMonde><br>  <sections><br>    <section><br>    International<br>    </section><br>    <section>Europe</section><br>    <section>France</section><br>    ...<br>  </sections><br></newpaper> | <newspaper title=LeMonde><br>  <sections><br>    <section><br>    World<br>    </section><br>    <section>Europe</section><br>    <section>France</section><br>    ...<br>  </sections><br></newpaper> |

*FIG. 3A*

| FRENCH SOURCE | ENGLISH TRANSLATION |
|---|---|
| <company name=LigneExpress><br>...<br>  <transport type=I><br>  International<br>  </transport><br>  <transport type=N><br>  National<br>  </transport><br>  <transport type=R><br>  Regional<br>  </transport><br></company> | <company name=LigneExpress><br>...<br>  <transport type=I><br>  International<br>  </transport><br>  <transport type=N><br>  National<br>  </transport><br>  <transport type=R><br>  Regional<br>  </transport><br></company> |

*FIG. 3B*

RETRIEVAL METHOD FOR TRANSLATION MEMORIES CONTAINING HIGHLY STRUCTURED DOCUMENTS

BACKGROUND

The following relates to natural language translation. It finds particular application in conjunction with efficient re-use of information in computer assisted translation, and will be described with particular reference thereto. However, it is to be appreciated that the following is also amenable to other like applications.

Computer aided translation systems provide assistance in translating documents from a source language into a target language. Such systems will provide a human translator with a convenient computer environment to produce target-language translations to source-language texts. In addition to multilingual text-processing facilities, a computer-assisted translation system will typically include functionalities such as easy access to electronic dictionaries and glossaries, as well as terminology management tools.

To increase efficiency and accuracy of computer aided translation, a translation memory is provided in some systems. The translation memory stores paired source language-target language translation units. The pairs are generated based on previous translations. This stored information allows the previous translations to be re-used in subsequent translation tasks.

In certain highly repetitive documents, such as weather bulletins, financial reports, avalanche warnings, technical manuals, and so forth, substantial portions of the document are frequently repeated. For example, each successive weather bulletin includes common heading information indicating the issuing weather station, the geographical region covered by the bulletin, and so forth. Rather than re-translating this common information each time a new weather bulletin is issued, the translation memory is consulted to re-use the previous translation of the common content. Similarly, a revised version of a document often contains substantial portions of content that are unchanged versus earlier versions. The translation memory is consulted to re-use the previous translation of the unrevised portions of content.

The likelihood of finding a match in the translation memory increases as the size of the translation unit decreases. For example, it is more likely that a single sentence will find a match in the translation memory than an entire paragraph. Accordingly, the translation units are typically chosen to be small, corresponding to textual units such as sentences, phrases, or bullet points.

However, in using small translation units, surrounding contextual information is lost. A consequence of the lost contextual information is an increased likelihood of obtaining multiple matches, in which a given source language translation unit has several close matches in the translation memory. In a given text collection, such multiple close matches can arise in contexts such as similar section headings and standardized front/back matter such as copyright information, disclaimers, and so forth. In collections related to a narrow subject, formulaic constructions sometimes arise, such as "Select Open in the File menu" in software manual collections or "Keep out of the reach of children" in pharmaceutical notices. In such cases, the translation memory may provide a number of close, but not identical, matches without providing a rationale for selecting one close match over the others. As a result, the human translator is called upon to make the selection.

This problem of multiple close matches without corresponding contextual rationale for selection can in principle be addressed by increasing the size of the translation units, thus retaining more contextual information and reducing the number of close matches. For example, rather than storing sentence-based or bullet point-based translation units, entire paragraphs or bullet lists can be stored. However, increasing the size of the translation units increases the likelihood that no match at all will be found, making the translation memory less valuable for freeing translators from repetitive work and increasing their productivity.

The following copending, commonly assigned applications: Bilingual Authoring Assistant for the "Tip of the Tongue" Problem (Xerox ID 20040609-US-NP, Ser. No. 11/018,758 filed Dec. 21, 2004); and Bi-Dimensional Rewriting Rules for Natural Language Processing (Xerox ID 20040117-US-NP, Ser. No. 11/018,892 filed Dec. 21, 2004) are herein incorporated by reference.

BRIEF DESCRIPTION

In accordance with one aspect, a translation apparatus is disclosed. A translation memory stores (i) source language target-language translation unit pairs and (ii) structural information for at least some source language translation units indicating a structural position within a document from which the source language translation unit was derived. A comparator compares a new source language translation unit with source language translation units stored in the translation memory. Each comparison includes (i) a textual comparison and (ii) a structural comparison between an identified structural position within a source language document from which the new source language translation unit was derived and the structural information for the source language translation unit stored in the translation memory. The comparator selects one or more proposed target language translation units as proposed translations for the new source language translation unit based on the comparing.

In accordance with another aspect, a translation method is provided. A structural position of a new source language translation unit is identified within a source language document from which the new source language translation unit was derived. The new source language translation unit is compared with source language translation units of source language-target language translation unit pairs stored in a translation memory. The comparing includes (i) comparing text of the new source language translation unit with texts of the stored source language translation units and (ii) comparing the identified structural position of the new source language translation unit with structural information pertaining to the stored source language translation units contained in the translation memory. Based on the comparing, at least one of the target language translation units is selected from the translation memory as a proposed target language translation of the new source language translation unit.

In accordance with yet another aspect, a storage medium is disclosed, storing instructions which when executed on an associated processor perform a translation method. The translation method includes: identifying a structural position of a new source language translation unit within a source language document from which the new source language translation unit was derived; computing a similarity parameter indicative of similarity between the new source language translation unit and a source language translation unit of a source language-target language translation unit pair stored in an associated translation memory; repeating the computing to determine similarity parameters for a plurality of source language-target language translation unit pairs stored in the associated translation memory; and selecting at least one of the target language translation units stored in the associated translation memory as a proposed target language translation of the new source language translation unit based on the computed similarity parameters. The similarity parameter includes (i) a textual similarity component indicative of textual similarity between the new source language translation unit and the stored source language translation unit and (ii) a structural similarity component indicative of similarity between the identified structural position of the new source language translation unit and stored structural information pertaining to the stored source language translation unit stored in the associated translation memory.

BRIEF DESCRIPTION OF THE DRAWINGS

FIGS. 3A and 3B illustrate situations in which the proper translation of the French source language word "International" depends upon the structural context of the document containing the word "International".

DETAILED DESCRIPTION

Figure 1:
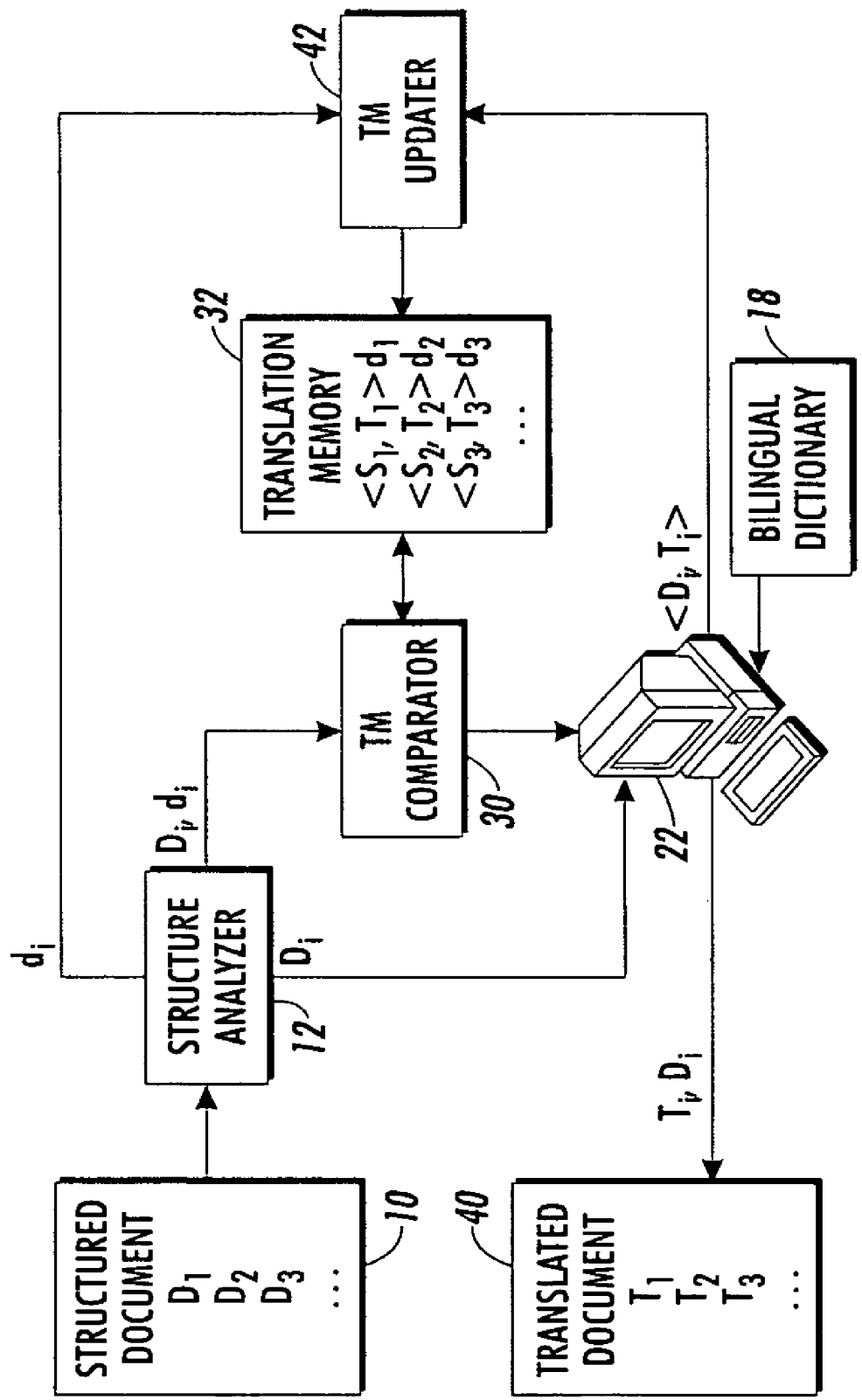
FIG. 1 diagrammatically shows a computer-assisted translation apparatus that includes selective re-use of previous translations as a user-functionality.

With reference to FIG. 1, a new source document 10 having content in a source language is to be translated into a target language. As just one illustrative example, in some embodiments the source language may be French and the target language may be English. In general, the source language can be any written or symbolic language, and the target language can be any other written or symbolic language. The source document 10 is a structured document in which the textual content is organized in accordance with a document annotation scheme such as extensible markup language (XML), standard generalized markup language (SGML), hypertext markup language (HTML), or so forth. A structure analyzer 12 analyzes the structured document 10 to determine a set of new source language translation units $D_1$, $D_2$, $D_3$ . . . and outputs each new source language translation unit (denoted "$D_i$") in turn for translation.

The new structured document 10 can be represented as a rooted, labeled, ordered tree, in which the leaves correspond to the textual data, and all internal nodes correspond to abstract structural entities. XML, SGML, HTML, and a number of other document annotation schemes comport with such a tree representation. The structure analyzer 12 outputs the new source language translation unit $D_i$ and also outputs for each $D_i$ a corresponding identified structural position (denoted "$d_i$") within the structured document 10 from which the new source language translation unit $D_i$ was derived.

With continuing reference to FIG. 1, the computer-aided translation system includes at least a bilingual lexicon or dictionary 18 and a user interface 22. The computer-aided translation system provides an authoring framework within which the human translator can perform the translation of the new source language translation unit $D_i$, via the user interface 22. Such an authoring framework typically includes a word processor, text editor, or other software for editing text, access to the electronic dictionary or lexicon 18, and optionally other tools useful to the human translator. Optionally, machine translation capability is included to perform some translation tasks algorithmically.

In some cases, the new source language translation unit $D_i$ is similar or identical to one or more previously translated source language translation units. To take advantage of such situations, the structure analyzer 12 also outputs the new source language translation unit $D_i$ and the corresponding identified structural position $d_i$ to a translation memory comparator 30 that compares the text of the new source language translation unit $D_i$ with source language translation units (denoted "$S_k$") of source language-target language translation unit pairs (denoted "$<S_k, T_k>$", where "$T_k$" is the paired target language translation unit) contained in a translation memory 32. The comparisons incorporate both textual comparison (based on the text of the source language translation unit $D_i$) and structural comparison (based on the identified structural position $d_i$). If one or more matches are found, they are communicated to the human translator or other user via the user interface 22 as proposed translations, and the translator selects one of the matches as the "best" translation.

Optionally, the human translator may revise the text of the closest match to more precisely match with the new source language translation unit $D_i$. If machine translation capability is provided, it also optionally may revise the text to correct certain aspects. For example, if the new source language (French) translation unit is: "Bulletin meteo pour jeudi" and the proposed target language (English) translation unit retrieved from the translation memory 32 is: "Weather bulletin for Wednesday", the human translator may recognize that the French word "jeudi" corresponds to the English day-of-the-week "Thursday" and accordingly manually replace "Wednesday" by "Thursday" in the proposed target language (English) translation unit to produce the final translation: "Weather bulletin for Thursday".

The translation units in the target language produced by the human translator are collected in a translation document 40 which is structured in one-to-one correspondence with the source document 10 based on the identified structural positions $d_i$ corresponding to the translation units $D_i$. The resulting translated document 40 is a translation in the target language of the source document 10. The translation document 40 is a structured document that is aligned with the source language document 10 at the translation unit level.

For each new source language translation unit $D_i$, if the corresponding translation unit $T_i$ in the target language output by the translator is not found identically in the translation memory 32, then a translation memory updater 42 adds a new source language-target language translation unit pair $<D_i, T_i>$ to the translation memory 32 for possible reuse in later translations. The memory updater 42 adds the new entry including structural information corresponding to the identified structural position $d_i$. Such new entries can be generated either by the human translator, by a machine translation capability of the system, or by re-used translations extracted from the translation memory 32 which are modified by the human translator via the user interface 22.

The translation apparatus shown in FIG. 1 is an illustrative example. The skilled artisan can readily modify this illustrated apparatus to comport with specific applications. For example, the various components 12, 18, 22, 30, and so forth, which are illustrated as separate components in FIG. 1, can be integrated or combined in various ways. The user interface 22 can be a self-contained computer with some or all of the translation components residing as software stored on a hard drive or other storage unit of the user interface 22. Alternatively, the user interface 22 can be a network terminal and various components such as the bilingual dictionary 18 can reside as software stored on a network or on a website over the Internet. The translation software, translation memory update and retrieval software, and so forth, wherever it is stored, can be executed on a processor of the user interface 22, on a remote processor of a network server, website server, or the like, or on some other processor.

The translation memory comparator 30 matches and retrieves material based on similarity measures (denoted $\delta$) each indicative of similarity between the new source language translation unit $D_i$ and one of the source language translation units $S_k$ stored in the translation memory 32. A paired target language translation unit $T_k$ is deemed relevant, and thus potentially re-usable or recuperable, if the similarity measure $\delta$ between $S_k$ and $D_i$ meets a threshold or other criterion. When multiple source language-target language translation unit pairs <$S_k$, $T_k$> stored in the translation memory 32 satisfy this threshold condition, then all matches, or the N closest matches, are proposed (where $N \geq 1$). In some embodiments, one or both of the selected threshold and N are user-selectable or configurable. Typically, proposed translations are ranked in decreasing order of similarity with $D_i$.

The similarity value $\delta$ includes a textual similarity component (denoted $\delta_T$) and a structural similarity component (denoted $\delta_S$). The textual similarity value $\delta_T$ is suitably computed as follows. The textual string $T(D_i)$ includes the text of the new source language translation unit $D_i$ with any structural markup removed. Similarly, the textual string $T(S_k)$ includes the text of the stored source language translation unit $S_k$ obtained from the translation memory 32, again with any structural markup removed. The textual similarity value $\delta_T$ is indicative of the similarity of strings $T(D_i)$ and $T(S_k)$. In some embodiments, the similarity value $\delta_T$ is computed based on the Levenshtein distance between the strings $T(D_i)$ and $T(S_k)$; however, other measures of string similarity can be employed.

Figure 2:
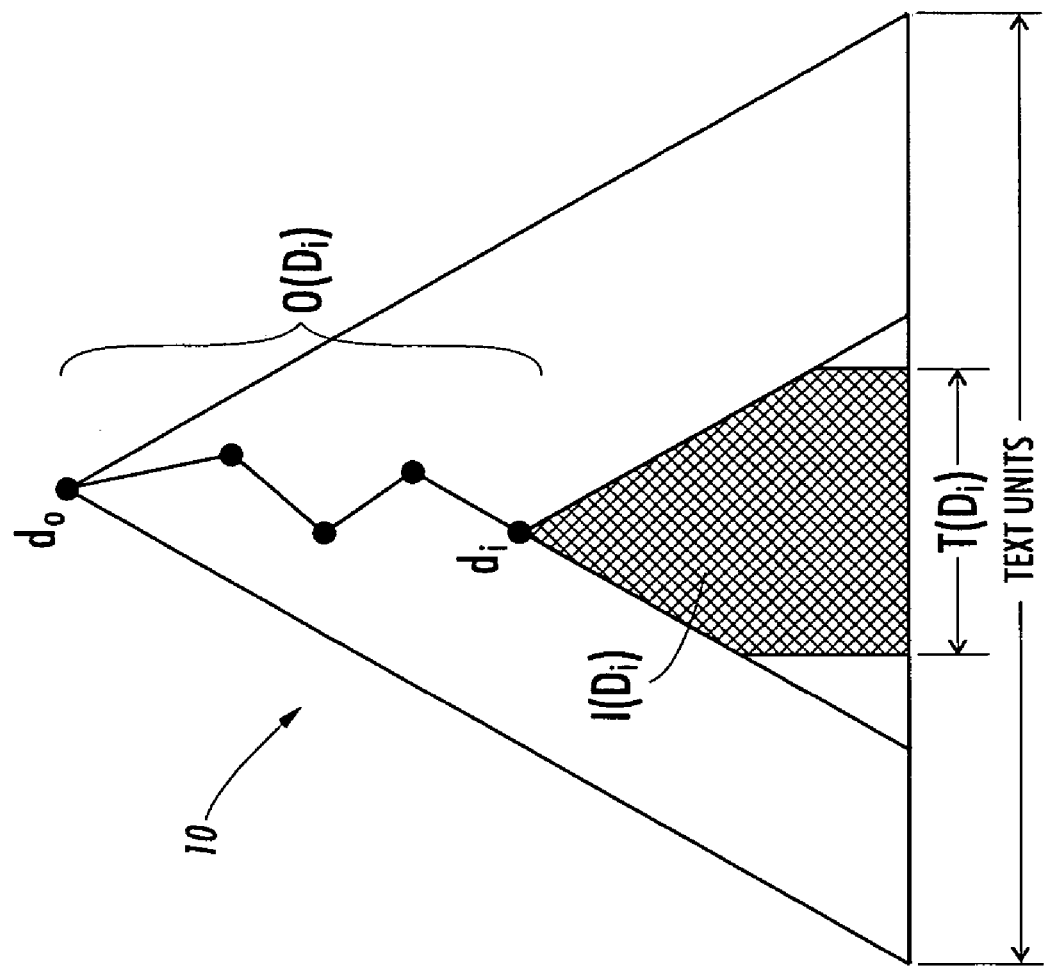
FIG. 2 diagrammatically illustrates an identified structural position $d_i$ of a new source language translation unit $D_i$ within a source language document from which the new source language translation unit $D_i$ was derived, with the outer structure, inner structure, and textual content diagrammatically represented.

With reference to FIG. 2, the structural similarity value $\delta_S$ is suitably computed as follows. The identified structural position "d" includes an outer structure and an inner structure. In some embodiments, the structural similarity value $\delta_S$ is a combination of an inner structural similarity component $\delta_I$ and an outer structural similarity component $\delta_O$. In other embodiments, the structural similarity value $\delta_S$ includes only one component: either the inner structural similarity component $\delta_I$, or the outer structural similarity component $\delta_O$. The outer structure corresponds to an outer path between the identified structural position $d_i$ and the root (denoted "$d_o$") of the structured document 10 from which the new source language translation unit $D_i$ was derived. The path between positions $d_o$ and $d_i$ is a path through a document tree and can be viewed as a string $O(D_i)$. The corresponding outer structure for the stored source language translation unit $S_k$ is suitably denoted as string $O(S_k)$. Then the outer structure similarity value $\delta_O$ is a function of the similarity of strings $O(D_i)$ and $O(S_k)$, which can be computed based on the Levenshtein distance between $O(D_i)$ and $O(S_k)$ or by using another suitable quantitative similarity measure.

In some embodiments, the portion of the outer structure proximate to $D_i$ is preferentially weighted in computing the outer structural similarity component $\delta_O$. Such preferential weighting can advantageously accentuate the importance of nearby structure that sometimes is more significant for translation re-use decisions versus more distal outer structure. For example, an element address might be allowed in different places, such as both as a sub-element of employee and of organization elements in a corporate document, and its translation may be relevant regardless of what larger context it appears in. To take this into account, the similarity measure between $O(D_i)$ and $O(S_k)$ is suitably modified to give less weight to nodes closer to the root of the document. In some embodiments, the respective lengths of the compared paths may not be very relevant to the outer structural similarity component $\delta_O$. For example, whether an address element appears near the top of the structure or deep down inside may not have much impact on the recuperability of its translation. The outer structure similarity component $\delta_O$ optionally also accounts for this, for example by considering consecutive insertions or deletions of path elements as a single "edit" operation in the Levenshtein distance.

With continuing reference to FIG. 2, the inner structure corresponds to a subtree of the structural tree of the document 10 rooted at the identified structural position $d_i$, whose nodes can be reached from the leaves spanned by the new source language translation unit $D_i$, excluding the leaves themselves, when following edges upwards toward the identified structural position $d_i$. The inner structure corresponding to $D_i$ is denoted as $I(D_i)$. To determine the inner structure, one starts from the left boundary of the translation unit, and follows parent nodes all the way up to the identified structural position $d_i$, removing all siblings to the left along the way; this process is repeated starting from the right boundary of translation unit (removing siblings to the right this time); the remaining subtree under the identified structural position $d_i$ is the inner structure. The corresponding inner structure of the stored source language translation unit $S_k$ is suitably denoted $I(S_k)$.

In this example embodiment, these inner structure measures are trees; accordingly, the inner structural similarity component $\delta_I$ is suitably computed as a tree edit distance between $I(D_i)$ and $I(S_k)$. Determining a tree edit distance is generally computationally intensive; however, since the textual translation units generally are located near terminal points of the tree structure, the subtrees $I(D_i)$ and $I(S_k)$ are generally small. In some other embodiments, the inner structural similarity component $\delta_I$ is computed differently, for example based on the Levenshtein distance between textual representations of the subtrees. The textual representations can be constructed, for example, as a concatenation of node labels as encountered in a depth-first traversal of the subtrees.

As between the textual similarity value $\delta_T$ and the structural similarity value $\delta_S$, the textual similarity is typically the more important component. Accordingly, in some embodiments the textual similarity value $\delta_T$ is first computed, and is then modified by a structural similarity value $\delta_S$. In some embodiments, modification by $\delta_S$ is performed only if there is more than one proposed matching translation $T_k$ (as selected based on textual comparison $\delta_T$) so as to provide context for selecting between the several proposed similar translations $T_k$.

In some embodiments, the overall similarity value $\delta$ is computed as a combination of the textual similarity value $\delta_T$ and the structural similarity value $\delta_S$. For example, the overall similarity value $\delta$ in some embodiments is suitably written as:

$$\delta = f(\delta_T, \delta_I, \delta_O) \quad (1),$$

where $\delta_T$ indicates textual similarity between $D_i$ and $S_j$, $\delta_I$ indicates similarity between the inner structure extending from the identified structural position and corresponding structural information of $S_k$, $\delta_O$ indicates similarity between an outer structure connecting with $D_i$ and corresponding structural information of $S_k$, and $f(\ )$ is a mathematical function combining $\delta_T$, $\delta_I$, and $\delta_O$. Using symbolic representations set forth herein, Equation (1) can be expanded as:

$$\delta(D_i, S_k) = f(\delta_T(T(D_i), T(S_k)), \delta_I(I(D_i), I(S_k)), \delta_O(O(D_i), O(S_k))) \quad (2).$$

In some embodiments, the combining function f( ) is a linear combination, in which case the similarity value δ is suitably written as:

$$\delta(D_i, S_k) = \alpha \cdot \delta_T(T(D_i), T(S_k)) + \beta \cdot \delta_I(I(D_i), I(S_k)) + \gamma \cdot \delta_O(O(D_i), O(S_k)) \quad (3).$$

In some embodiments, α, β, and γ are each in a range [0,1], and α+β+γ=1. In embodiments in which the structural similarity value $\delta_S$ includes only the inner structure, γ=0. In embodiments in which the structural similarity value $\delta_S$ includes only the outer structure, β=0. Using α>>β and α>>γ in the linear combination advantageously weights the similarity value δ such that the textual similarity value $\delta_T$ dominates the overall similarity δ, with the structural similarity value $\delta_S$ acting as a modification of the textual similarity value.

Structural information for the source language translation units $S_k$ is stored in the translation memory 32, in order to enable determination of $I(S_k)$ and $O(S_k)$. Assuming a monotonic one-to-one correspondence in alignment levels of the source language and target language translation unit components of the source language-target language translation unit pairs <$S_k$, $T_k$>, an alignment map can be efficiently implemented as a sorted array of pairs of non-negative integers (x, y); in each such pair, x denotes an offset into a source language document, corresponding to the beginning of a source language translation unit $S_k$, and y denotes the position of the corresponding target language translation unit $T_k$ in the translated target language document. Given a specific position in a source or target language document, one can efficiently find the boundaries of the translation unit to which it belongs, by binary-searching the array. Moreover, one directly obtains the boundaries of the corresponding translation unit in the opposite document. If the documents are XML, an alternative to absolute file offsets is to use the XPointer notation provided in XML. This latter approach is portable; however, it involves navigating the nodes of the document tree, which can be computationally intensive.

In the structure-comparison phase, the inner and outer structures of translation units of the translation memory 32 are determined, which involves navigating through the tree nodes. In some embodiments, a "structural map" of individual documents is pre-computed to provide a representation of the document tree that allows rapid navigation through the nodes (for example, from a given node, direct access to its parent, children and sibling nodes) and efficient switching back-and-forth between a node to its textual contents.

To perform efficient text comparison, the translation memory 32 should be efficiently searched on the basis of its textual contents. The searching suitably employs an approximate string matching technique. In some embodiments, a suitable indexing of contents of the translation memory 32 is used to speed up the text searching. In some embodiments, the translation memory 32 employs a physical storage model for XML documents in which the textual and structural contents are stored separately, suitably complemented with alignment maps and text indexing. One suitable physical storage model is described in Scheffner and Freytag, "Access Support Tree & TextArray: A Data Structure for XML Document Storage & Retrieval", in Proceedings of the 14th International Conference on Scientific and Statistical Database Management (SSDBM 2002), Edinburgh, Scotland, July 2002.

In some embodiments, the structural similarity value $\delta_S$ is computed taking into account both node labels and the "shape" of the document tree (the "shape" of a tree refers to its overall structure, disregarding labels that appear on nodes or leaves). Such an approach is suitable when the documents being compared are structured similarly, for example using the same document type definition (DTD) or schema. In some embodiments, the node labels are not incorporated into computation of the similarity value $\delta_S$; rather, the similarity value $\delta_S$ is computed based entirely on the "shape" of the document tree. For the outer structure, this amounts to comparing path lengths. This shape-only approach ignoring node labels is advantageous when the documents are structured differently, for example using different DTD or schema. Optionally, the similarity values relating to the node labels and to the shape components, respectively, are segregated. For example, the inner structure similarity value $\delta_I$ can take the form:

$$\delta_I(I(D_i), I(S_k)) = \eta \cdot \delta_{shape}(I(D_i), I(S_k)) + (1-\eta) \cdot \delta_{labels}(I(D_i), I(S_k)) \quad (4),$$

where $0 \leq \eta \leq 1$, $\delta_{shape}$ measures inner sub-tree shape similarity, and $\delta_{labels}$ measures inner sub-tree node labels similarity. For instance, $\delta_{shape}$ can be quantified by a tree edit distance value, while $\delta_{labels}$ is quantified by a Levenshtein distance between the depth-first concatenation of node labels.

In some embodiments, the translation memory 32 includes source language-target language translation unit pairs from both structured and unstructured documents. For translation units obtained from translations of unstructured documents, there is no structural information available, and the stored structural information for these source language translation units is either omitted or indicates that the document from which the source language translation unit was derived is an unstructured document. In such situations, the structural similarity value $\delta_S$ is suitably omitted in the similarity comparison. For example, in Equation (3) this can be achieved by setting α=1 and β=γ=0 for these comparisons in which the stored source language translation unit $S_k$ was acquired from an unstructured document. Similarly, in some translation tasks the source document may be an unstructured document, and accordingly the similarity comparisons suitably omit the structural similarity component $\delta_S$ in computing the overall similarity δ.

The various weighting parameters, such as α, β, and γ of Equation (3) or η of Equation (4), can be determined in various ways, such as by user-selection of the values, or hard-coding of weighting values known to work in most situations. In other approaches, an automated optimization or learning algorithm is employed. For example, the similarity measures $\delta_T$, $\delta_O$, $\delta_I$, etc. can be given as input to a multilayer neural network, whose output becomes the global similarity measure δ. The neural network parameters are suitably set to minimize the work required of the translator to produce a new translation. When the contents of the translation memory 32 are sufficiently large, learning examples for training the neural network can be constructed directly from the contents of the translation memory 32.

FIGS. 3A and 3B illustrate example translations in which the structural similarity is employed to advantage in selecting between two close matches. FIG. 3A illustrates translation of a French newspaper source document written in French. The translation memory comparator 30 performs textual comparisons (using the textual similarity value $\delta_T$) for the new source language translation unit "International" (in French) and finds two matches in the translation memory 32: a first match in which the translation is the English word "International" and a second match in which the translation is the English word "World". The text of the stored source language translation unit in both matches exactly with the new source language translation unit "International". Accordingly, there is nothing in the textual analysis to indicate which translation ("International" or "World") is appropriate. However, when the structural similarity value $\delta_S$ is additionally considered, the identification of a newspaper context (indicated, for example, by surrounding node labels measured by the inner and outer similarity values $\delta_I$, is $\delta_O$) re-ranks the two matches to identify the best translation as "World". In contrast, in FIG. 3B, the source document is a corporate document also written in French. Again, the two matches yielding proposed translations "International" and "World" are found, with nothing in the textual analysis to indicate which is the best translation. When the structural similarity value $\delta_S$ is used to re-rank the two matches, the translation "International" is selected.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

The invention claimed is:

1. A translation apparatus comprising:
   a translation memory storing source language-target language translation unit pairs and structural information for at least some source language translation units indicating a structural position within a document from which the source language translation unit was derived; and
   a comparator comparing a new source language translation unit with source language translation units stored in the translation memory, each comparison including (i) a textual comparison and (ii) a structural comparison between an identified structural position within a source language document from which the new source language translation unit was derived and the structural information for the source language translation unit stored in the translation memory indicating the structural position of the source language translation unit within the document from which the source language translation unit was derived, the comparator selecting one or more proposed target language translation units as proposed translations for the new source language translation unit based on the comparing.

2. The translation apparatus as set forth in claim 1, wherein the comparator (i) computes a textual similarity value based on the textual comparison and (ii) computes a structural similarity value based on the structural comparison.

3. The translation apparatus as set forth in claim 2, wherein the comparator combines the textual similarity value and the structural similarity value to produce an overall similarity value.

4. The translation apparatus as set forth in claim 3, wherein the comparator derives an overall similarity value by modifying the textual similarity value by the structural similarity value.

5. The translation apparatus as set forth in claim 3, wherein the comparator derives an overall similarity value by computing a weighted sum of the textual similarity value and the structural similarity value.

6. The translation apparatus as set forth in claim 2, wherein the structural similarity value includes an outer structure similarity value indicating similarity between:
   an outer path between the identified structural position and a root of the source language document from which the new source language translation unit was derived, and corresponding structural information for the source language translation unit stored in the translation memory.

7. The translation apparatus as set forth in claim 2, wherein the structural similarity value includes an inner structure similarity value indicating similarity between:
   a structural sub-set of the source language document rooted at the identified structural position, and
   corresponding structural information for the source language translation unit stored in the translation memory.

8. The translation apparatus as set forth in claim 1, wherein the translation apparatus further includes:
   a user interface having:
      a display on which the one or more proposed translations selected by the comparator are displayed to an associated user, and
      a user input device by which the associated user selects one of the proposed translations.

9. The translation apparatus as set forth in claim 8, wherein the user interface receives from the associated user modifications to the selected one of the proposed translations.

10. The translation apparatus as set forth in claim 1, wherein denoting the new source language translation unit as $D_i$ and the compared source language translation unit stored in the translation memory as $S_k$, the comparator computes a similarity parameter $\delta$ between $D_i$ and $S_k$ given by:

$$\delta = f(\delta_T, \delta_I, \delta_O)$$

where $\delta_T$ indicates a textual similarity between $D_i$ and $S_k$, $\delta_I$ indicates a similarity between an inner structure extending from the identified structural position and corresponding structural information of $S_k$, $\delta_O$ indicates a similarity between an outer structure connecting with $D_i$ and corresponding structural information of $S_k$, and f denotes a function that combines $\delta_T$, $\delta_I$, and $\delta_O$.

11. The translation apparatus as set forth in claim 10, wherein the function f includes a linear combination of $\delta_T$, $\delta_I$, and $\delta_O$.

12. The translation apparatus as set forth in claim 10, wherein the structural information for at least some of the source language translation units stored in the translation memory indicates that the document from which the source language translation unit was derived is an unstructured document.

13. A translation method comprising:
   identifying a structural position of a new source language translation unit within a source language document from which the new source language translation unit was derived;
   comparing the new source language translation unit with source language translation units of source language-target language translation unit pairs stored in a translation memory, the comparing including (i) comparing text of the new source language translation unit with texts of the stored source language translation units and (ii) comparing the identified structural position of the new source language translation unit with structural information pertaining to structural positions of the stored source language translation units in documents from which the stored source language translation units were obtained, said structural information also being contained in the translation memory; and
   based on the comparing, selecting at least one of the target language translation units from the translation memory as a proposed target language translation of the new source language translation unit.

14. The translation method as set forth in claim 13, wherein denoting the new source language translation unit as $D_i$ and the compared stored source language translation unit as $S_k$, the comparing includes:

computing a similarity parameter δ between $D_i$ and $S_k$ given by:

$$\delta = f(\delta_T, \delta_S)$$

where $\delta_T$ indicates a textual similarity between $D_i$ and $S_k$, $\delta_S$ indicates a structural similarity between the identified structural position and corresponding structural information of $S_k$, and f denotes a function that combines $\delta_T$ and $\delta_S$.

15. The translation method as set forth in claim 14, wherein $\delta_T$ is computed based on a Levenshtein distance between textual content of $D_i$ and textual content of $S_k$.

16. The translation method as set forth in claim 14, wherein $\delta_S$ includes a component $\delta_I$ indicating a similarity between an inner structure extending from the identified structural position and corresponding structural information of $S_k$.

17. The translation method as set forth in claim 14, wherein $\delta_S$ includes a component $\delta_O$ indicating a similarity between an outer structure connecting with $D_i$ and corresponding structural information of $S_k$.

18. The translation method as set forth in claim 17, wherein the component $\delta_O$ is computed by:
   computing a first string indicative of a path defining the outer structured,
   computing a second string indicative of a path defined by the corresponding structural information of $S_k$, and
   computing a similarity score based on a Levenshtein distance between the first and second strings.

19. The translation method as set forth in claim 17, wherein the portion of the outer structure proximate to $D_i$ is preferentially weighted in computing $\delta_O$.

20. The translation method as set forth in claim 13, wherein the comparing with each stored source language translation unit includes:
   computing a textual similarity parameter indicative of textual similarity between the new source language translation unit and the stored source language translation unit;
   computing a structural similarity parameter indicative of similarity between the identified structural position of the new source language translation unit and structural information pertaining to the stored source language translation units contained in the translation memory; and
   combining the textual similarity parameter and the structural similarity parameter to produce an overall comparison parameter used in the selecting.

21. A storage medium storing instructions which when executed on an associated processor perform a translation method comprising:
   identifying a structural position of a new source language translation unit within a source language document from which the new source language translation unit was derived;
   computing a similarity parameter indicative of similarity between the new source language translation unit and a source language translation unit of a source language-target language translation unit pair stored in an associated translation memory, the similarity parameter including (i) a textual similarity component indicative of textual similarity between the new source language translation unit and the stored source language translation unit and (ii) a structural similarity component indicative of similarity between the identified structural position of the new source language translation unit and stored structural information pertaining to structural position of the stored source language translation unit also stored in the associated translation memory;
   repeating the computing to determine similarity parameters for a plurality of source language-target language translation unit pairs stored in the associated translation memory; and
   selecting at least one of the target language translation units stored in the associated translation memory as a proposed target language translation of the new source language translation unit based on the computed similarity parameters.

22. The storage medium as set forth in claim 21, wherein the method further includes:
   modifying the proposed target language translation to generate a final translation of the new source language translation unit in the target language; and
   updating the associated translation memory with a new source language-target language translation unit pair including the new source language translation unit, the final translation in the target language, and the identified structural position of the new source language translation unit.

* * * * *